Patented Nov. 12, 1929

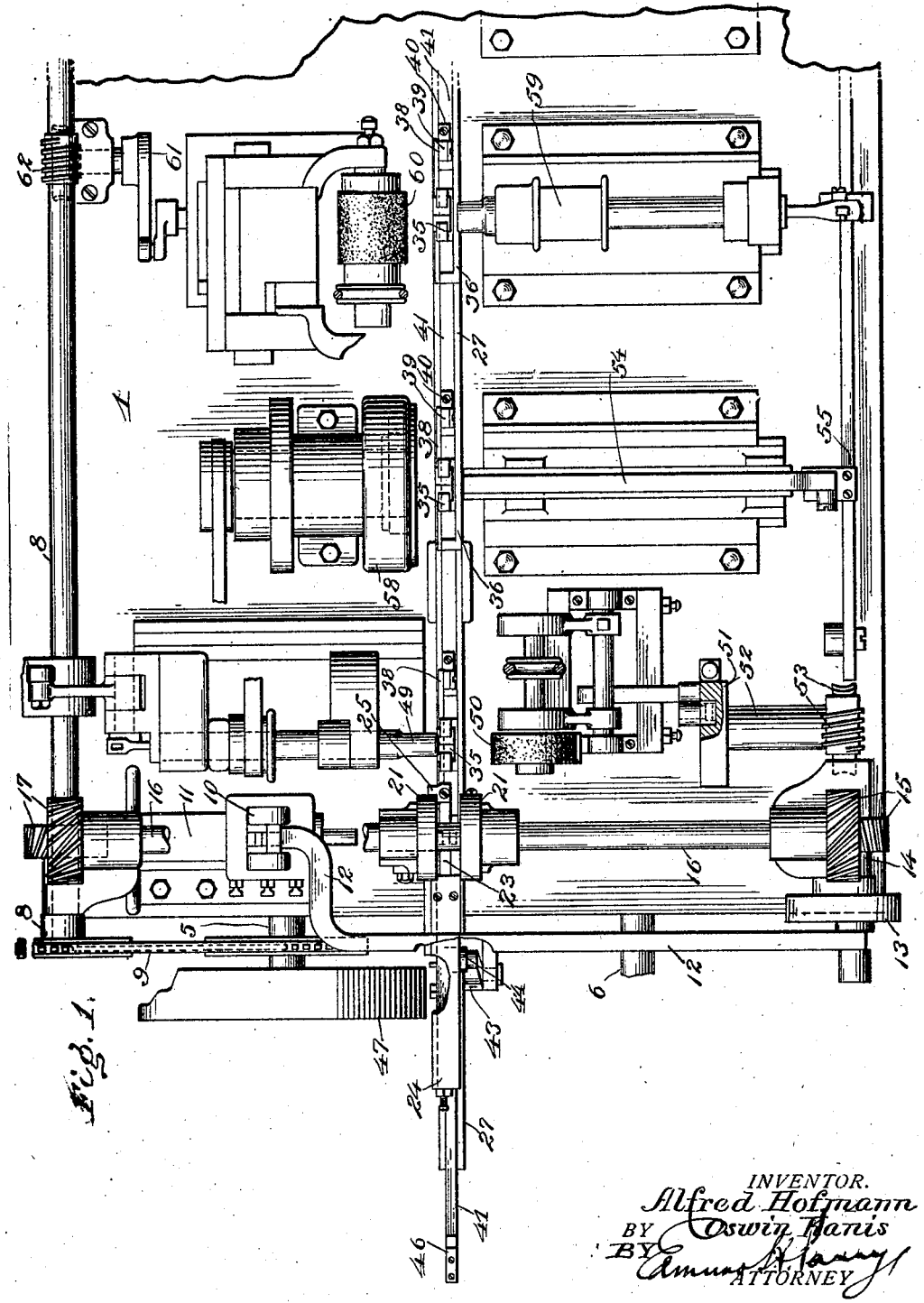

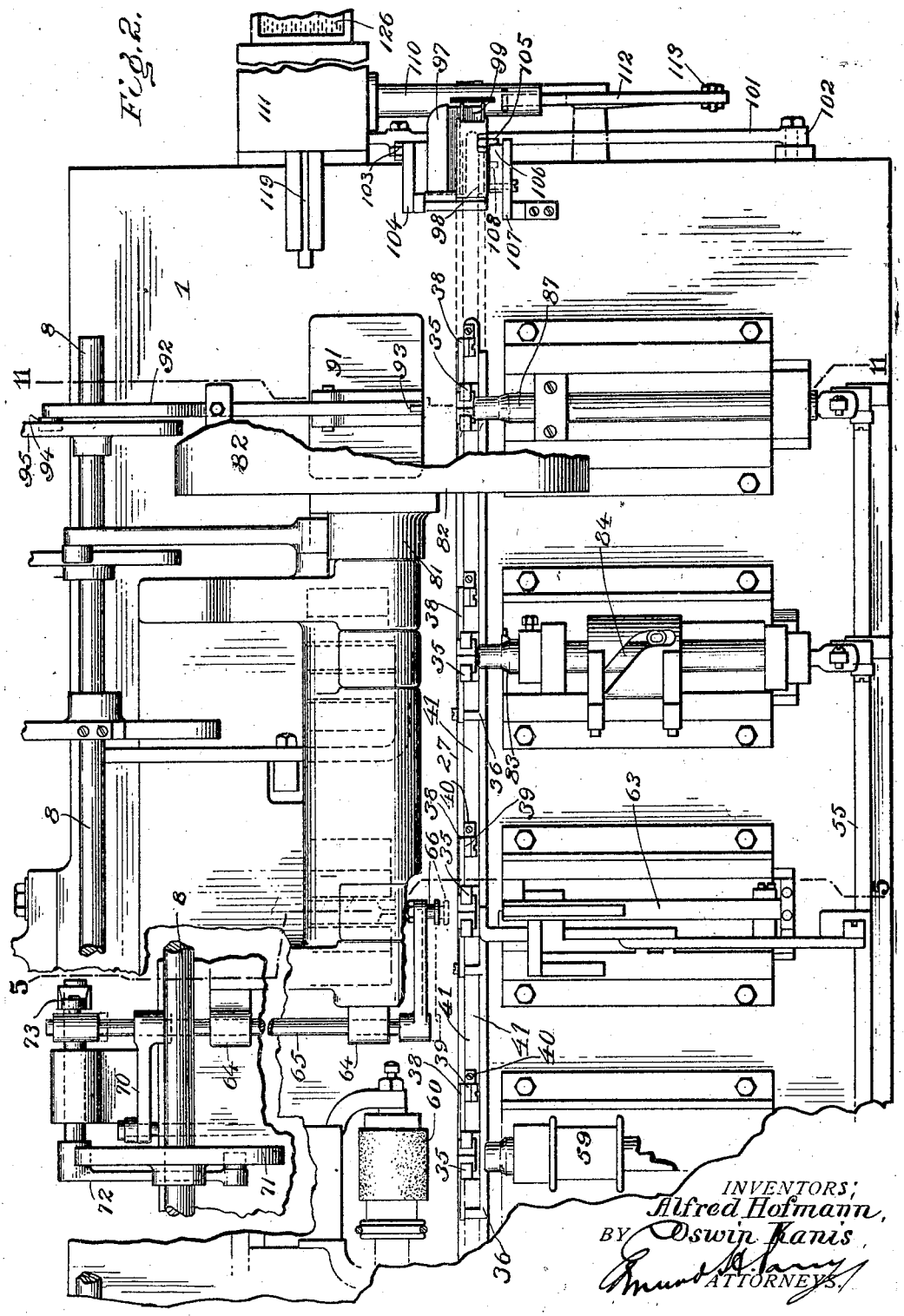

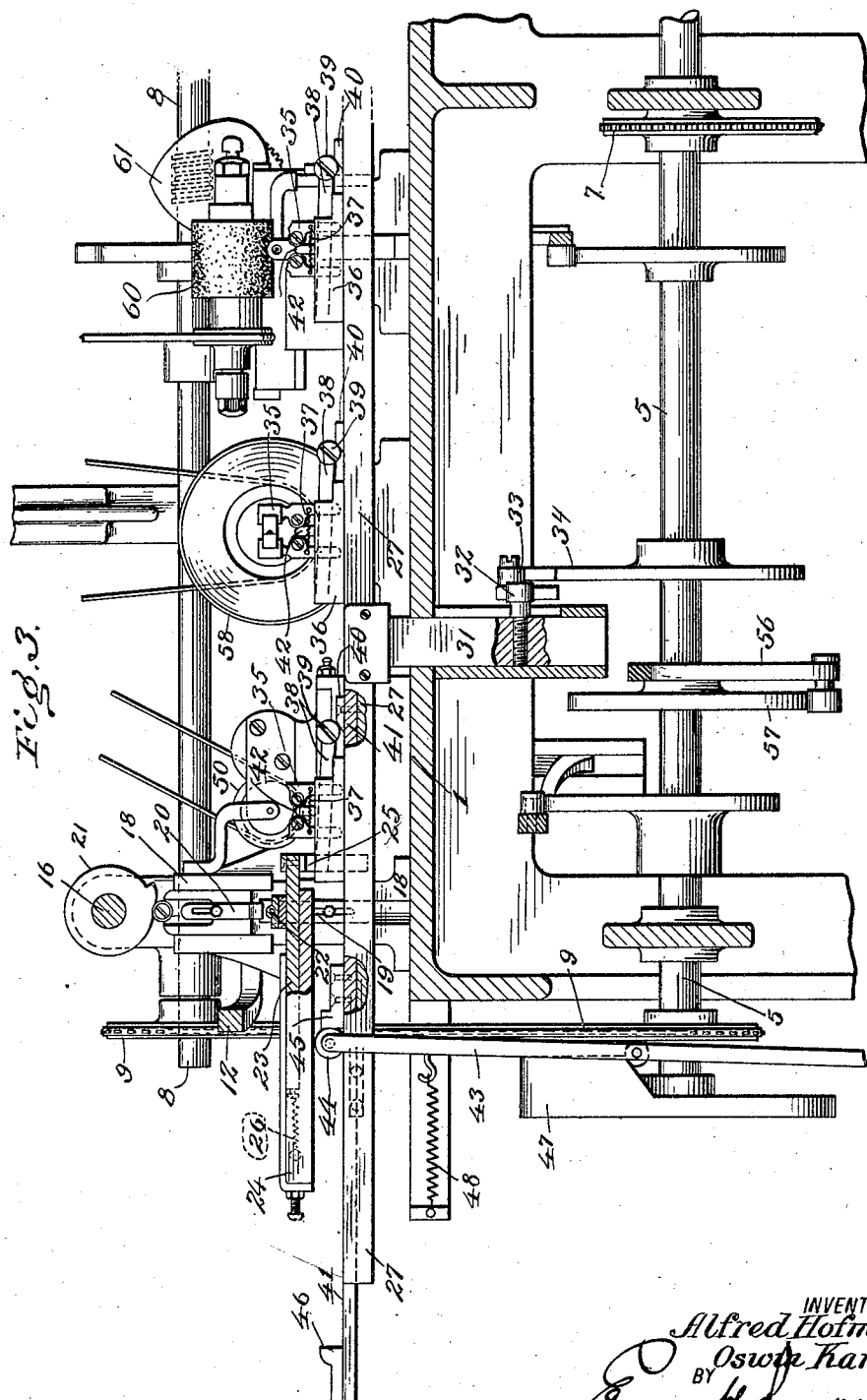

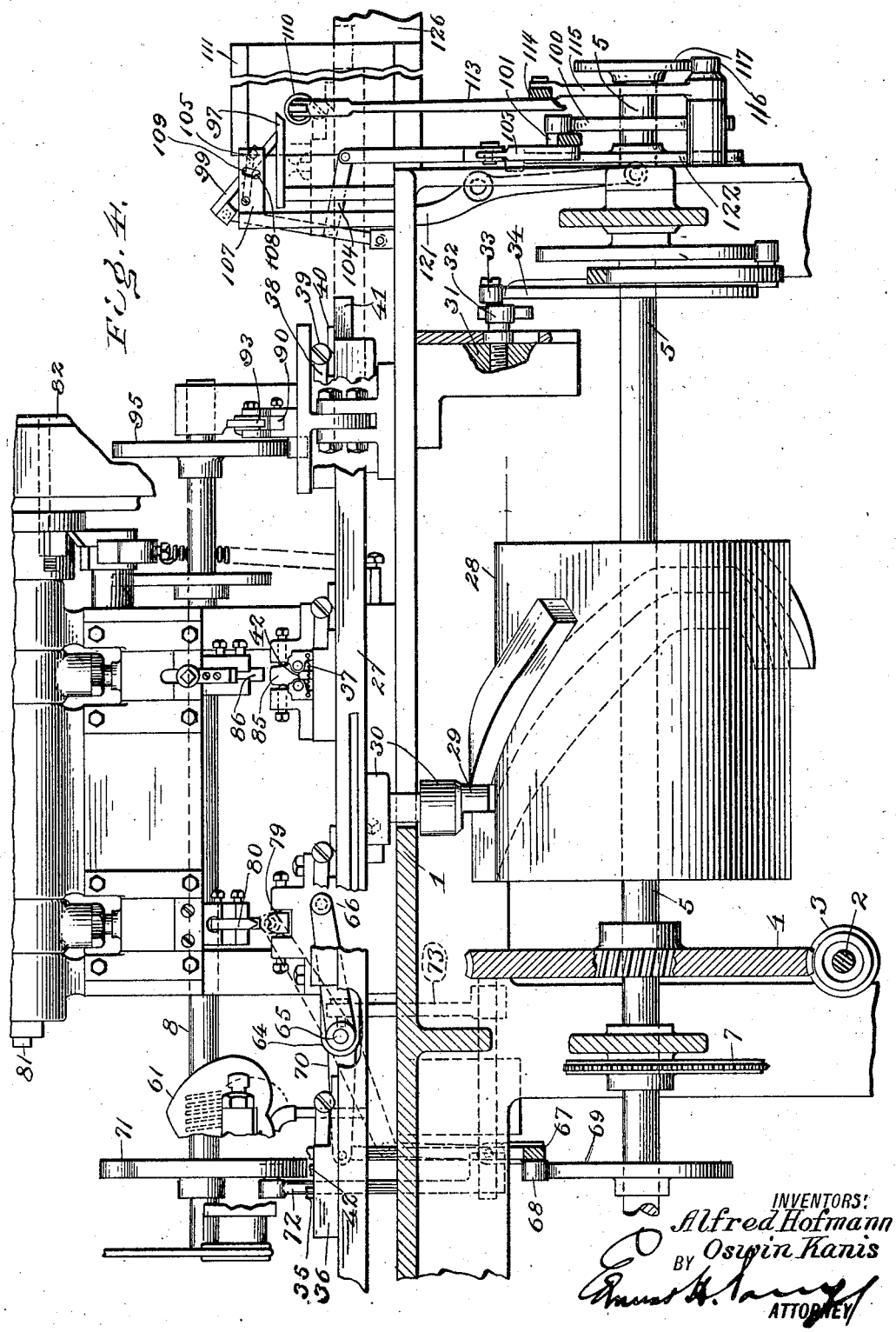

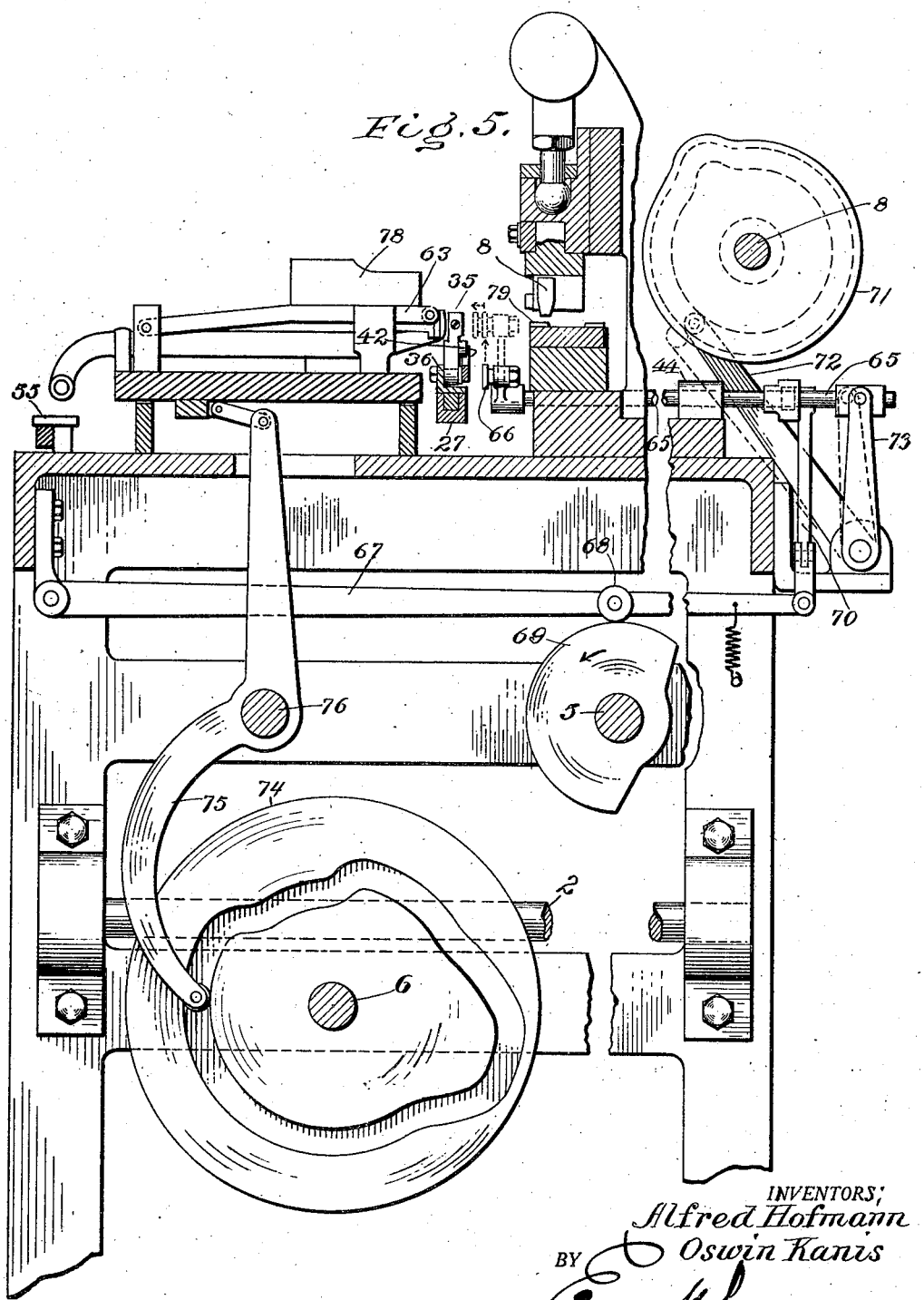

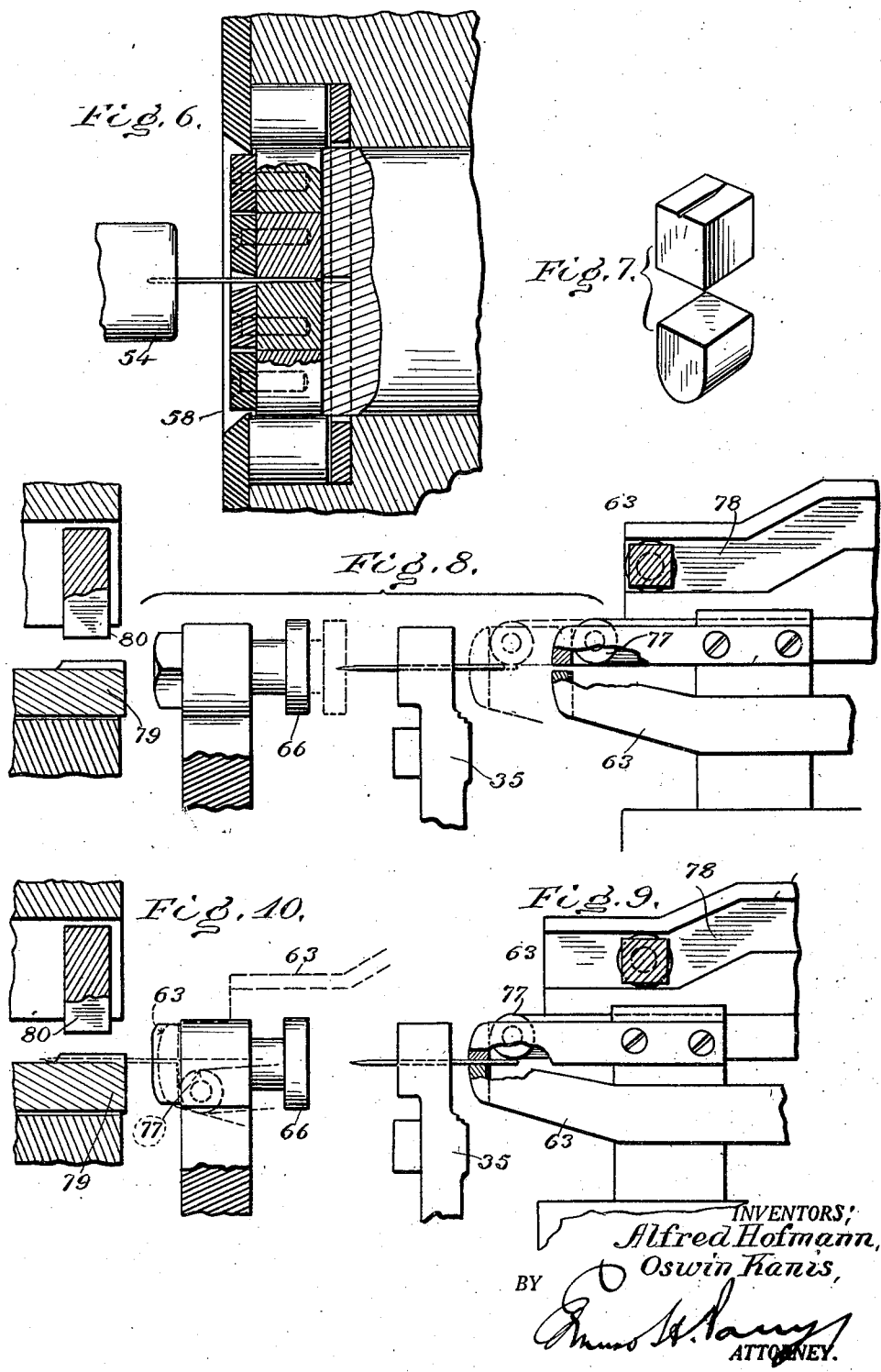

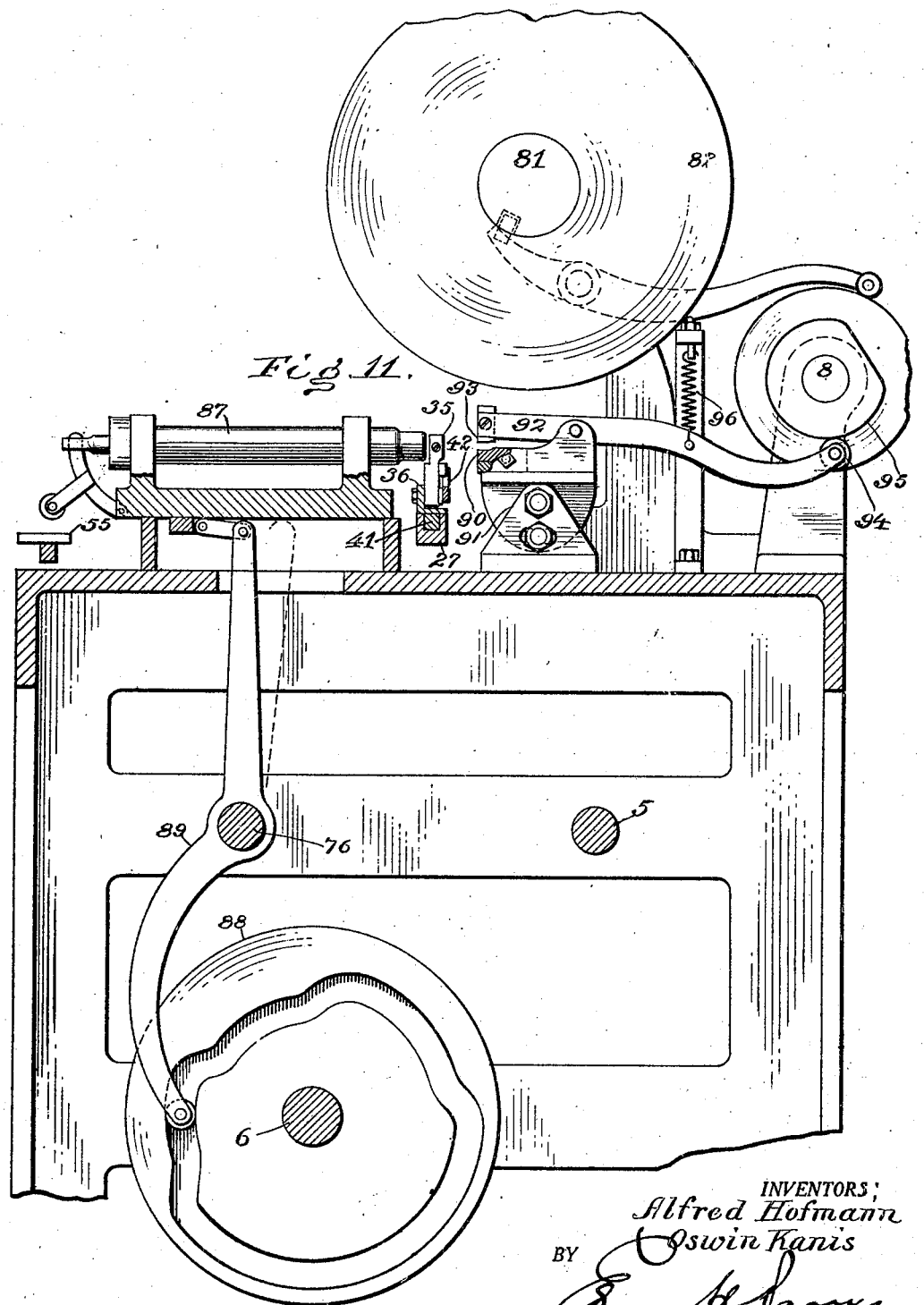

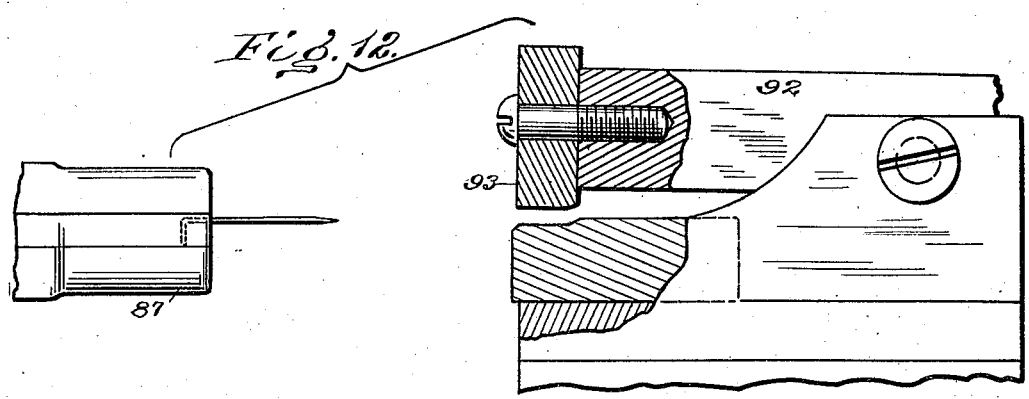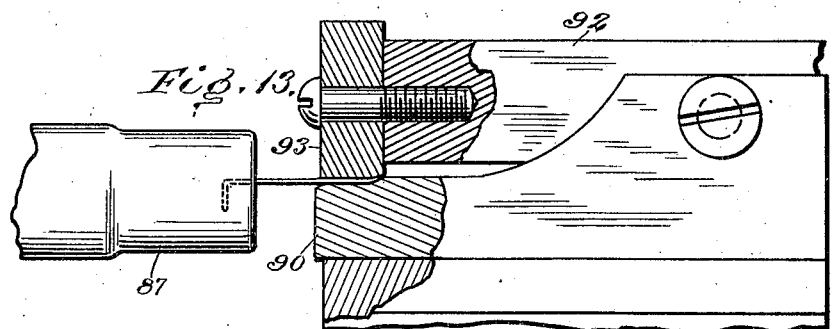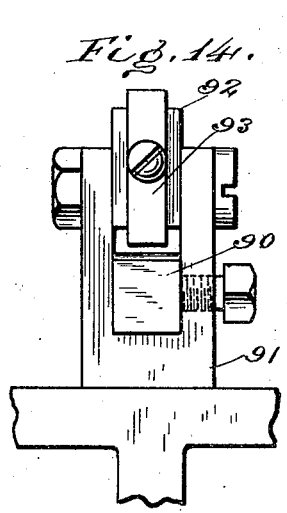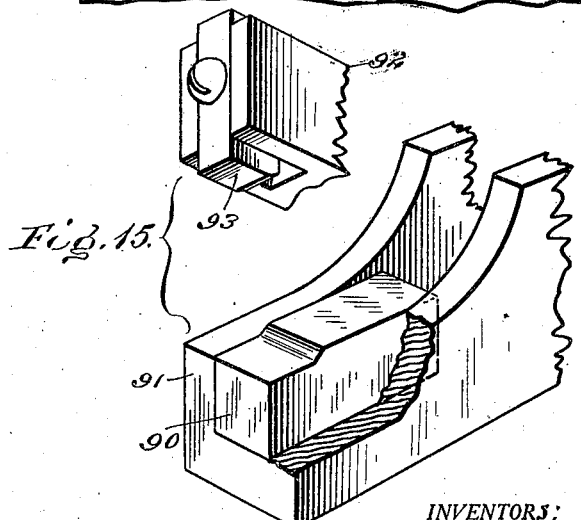

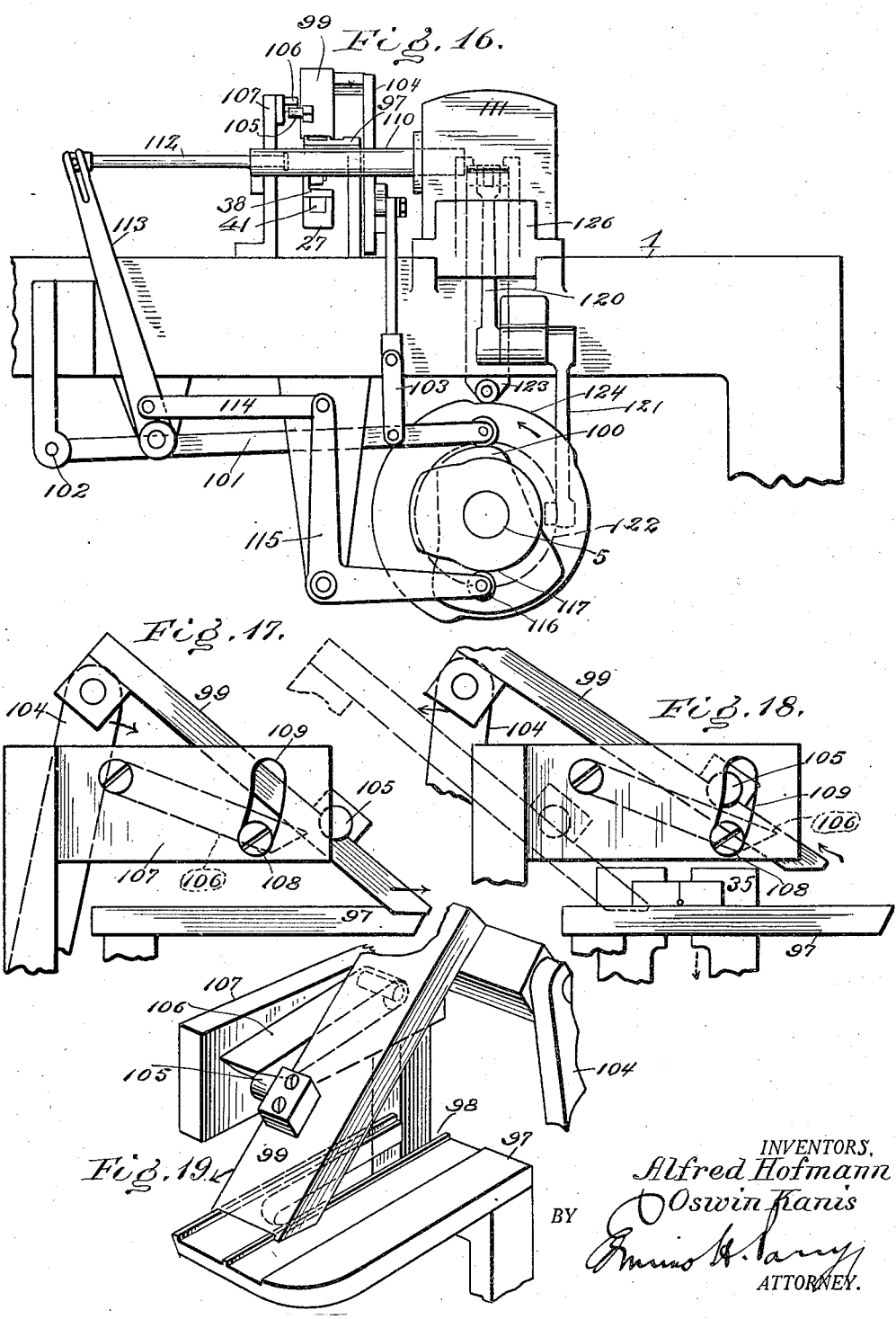

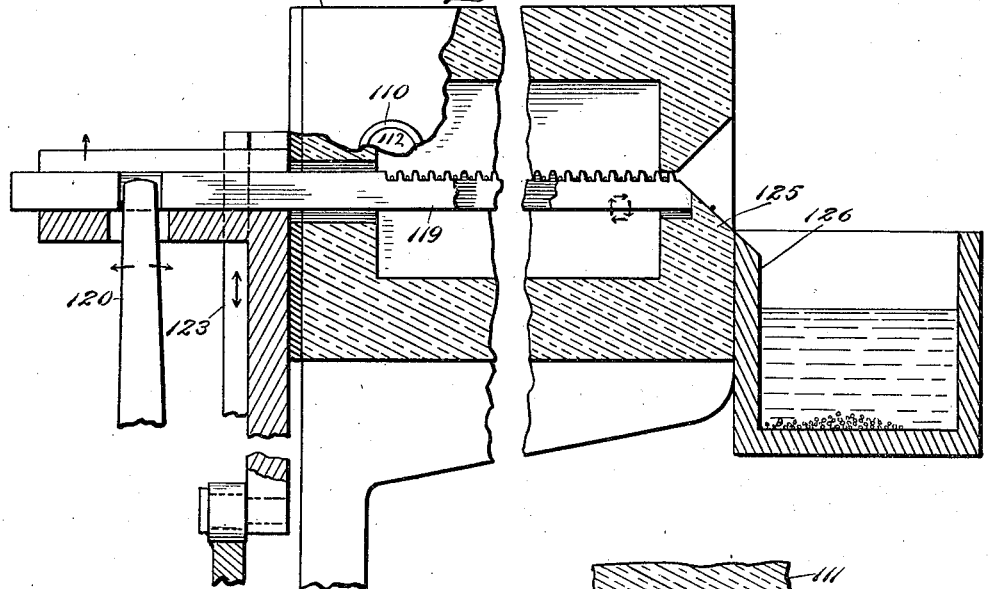
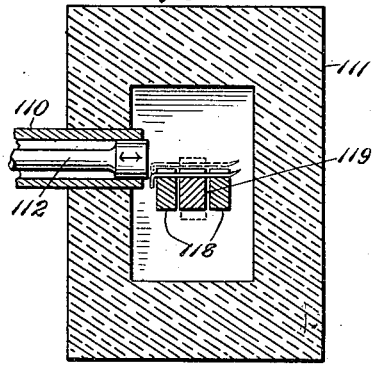
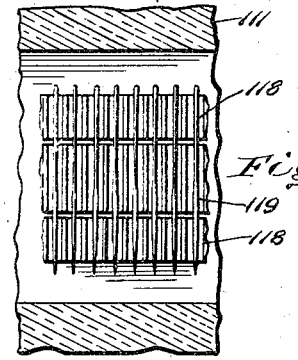
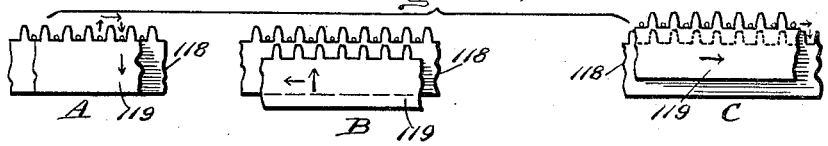

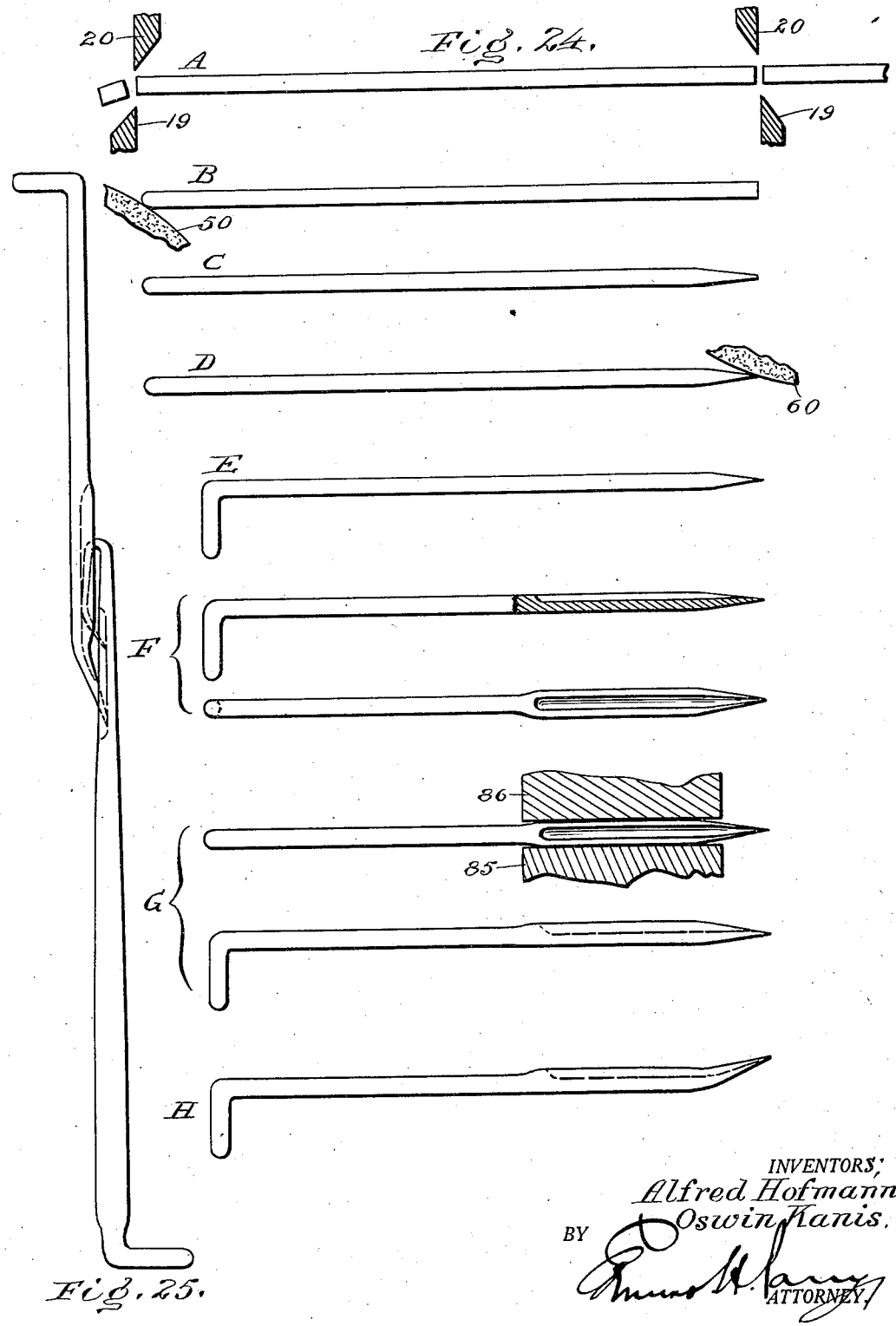

1,735,759

UNITED STATES PATENT OFFICE

ALFRED HOFMANN, OF FORT LEE, AND OSWIN KANIS, OF UNION CITY, NEW JERSEY, ASSIGNORS TO ALFRED HOFMANN NEEDLE WORKS, INC, OF UNION CITY, NEW JERSEY, A CORPORATION OF NEW JERSEY

NEEDLE-MAKING MACHINE

Application filed February 27, 1928. Serial No. 257,402.

This invention relates to needle making machines and, more particularly, to a machine for making narrowing-elements or points, sometimes also called "transfer-needles".

It is the primary object of the invention to provide a full-automatic machine, that is, a machine which is entirely automatic in its operation and which will make complete narrowing-points from blanks fed to the machine.

Another object is simultaneously to operate upon a plurality of narrowing-points in a single machine and successively to discharge therefrom a complete, marketable narrowing-point.

A further object within the contemplation of our invention is to provide a machine whereby, by a single continuous procedure, two general operations are performed, namely, an element-forming operation—involving swaging, grooving, flattening, pointing, and other operations—whereby a narrowing-element or point is formed and, then, a finishing operation involving tempering. These two general operations are performed in the same machine and successively, one to the other, resulting in the production of a finished product ready for the market.

A fundamental object of our invention is to produce a machine-made narrowing-point, that is, a point made entirely by machinery, without any hand manipulation in the course of its making, between cutting a wire to length to form the point-blank and the tempering of the formed point ready for the market.

It is a further object of the invention to provide a machine of this character having a plurality of units or stations, to each of which a narrowing-point-blank is successively transferred and at which one or more operations necessary to the completion of a point may be performed.

A further object is to provide a machine of this character with a carrier moving longitudinally of the machine and which transfers each point from station to station.

Still another object of the invention is to provide a machine of this character with a series of work-holders or chucks, each of which is adapted to reciprocate transversely of the machine and in relation to a longitudinally movable carrier and which inserts the points into an operating instrumentality and withdraws it therefrom upon completion of the operation.

A further object is to provide a carrier having point-carrying jaws by which a narrowing-point is held and maintained in chuck-taking position during its transfer from one station to another and which accurately present the point to a work-holder or chuck at each station.

A further object is to provide a machine having a plurality of point-carrying members, work-holders, and operating instrumentalities, all of which operate simultaneously on a plurality of elements and in synchronism.

A still further object of the invention is to subject a narrowing-point-blank to a series of operations whereby a narrowing-point is formed and then, as a finishing step, in the same machine, subject it to a tempering operation, involving the slow heating of the narrowing-point and its final introduction into an oil bath.

Other objects and advantages of the invention will in part be obvious and in part be more fully brought out as the description proceeds.

Our inventive-concept involves not only structure for making and finishing a narrowing-point ready for the market, as aforementioned, but, also, a method with which said structure may advantageously be utilized.

In the accompanying drawings, we have illustrated one of several possible and practical embodiments of our invention; but it is to be understood that the drawings are illustrative merely and are, in no way, to be considered as limiting the invention to the details therein shown. Many modifications and variations may be made by those skilled in the art without departing from the spirit or underlying principles and salient features of our invention.

In these drawings:

Fig. 1 is a plan view of the left half of a machine constructed according to our invention;

Fig. 2 is a plan view of the right half of the machine;

Fig. 3 is a sectional view of the left half of the machine taken substantially along the line of the transfer bar;

Fig. 4 is a sectional view of the right half of the machine taken along the same line as Fig. 3;

Fig. 5 is a vertical section taken on line 5—5 of Fig. 2;

Fig. 6 is a sectional view of the swage, showing the chuck holding the narrowing-point during this operation;

Fig. 7 is a perspective view of the swage blocks;

Fig. 8 is a collective view on an enlarged scale showing the position of the chuck, carrier-jaws, and groove punch, just prior to the groove-punching operation;

Fig. 9 is a view of the chuck with the narrowing-point in proper position and ready to advance toward the groove punch;

Fig. 10 is a view similar to Fig. 8 and showing, in dotted lines, the advanced position of the chuck when the groove is being punched and also the butt-end of the narrowing-point rolled down;

Fig. 11 is a sectional view taken on line 11—11 of Fig. 2 and illustrates the mechanisms for bending the point;

Fig. 12 is a collective view, partly in section, showing the narrowing-point held by the chuck prior to its introduction into the bending mechanism;

Fig. 13 is a view similar to Fig. 12, but showing the point at the completion of the bending;

Fig. 14 is a front view of the point-bending mechanism;

Fig. 15 is a broken perspective view of the bending anvil and die;

Fig. 16 is a side elevation of the take-off and tempering mechanism;

Fig. 17 is a view on an enlarged scale of the point-remover at the end of its forward stroke;

Fig. 18 is a view similar to Fig. 17 and showing, in solid lines, the position of the point-remover at the start of the return stroke and, in dotted lines, the initial position;

Fig. 19 is a perspective view of the point-remover;

Fig. 20 is a view, partly in section, illustrating the muffle furnace and oil bath;

Fig. 21 is a sectional view of the muffle furnace showing the point-carrying racks;

Fig. 22 is a horizontal section through the furnace and showing the point-carrying racks in plan;

Fig. 23 is a series of views, more or less diagrammatic, of the relative positions of the fixed and movable point-carrying racks at various stages in the progress of the elements through the furnace;

Fig. 24 is a series of views, on an enlarged scale, of the narrowing point and illustrates the various steps from cutting the blank to bending the point; and Fig. 25 is an enlarged view illustrating the use of the narrowing point in combination with a spring-beard needle of well-known construction.

General outline

In the machine of our invention, a blank is advanced successively to a series of units or stations at which one or more operations on the blank are performed. This machine is of the general type disclosed in our co-pending application Serial No. 232,794, filed November 12, 1927, now Patent No. 1,696,484, which is particularly adapted for the production of spring-beard needles. The present machine, however, includes many modifications in structure and operation in order to adapt it to the production of narrowing-points or "transfer needles".

In addition to a "general supporting and driving structure", the units or stations, preferably and as shown, include:

Wire straightening mechanism.
Cutting-to-length mechanism.
Initial transfer mechanism.
Main transfer mechanism.
Butt-grinding mechanism.
Swaging mechanism.
Pointing mechanism.
Butt-forming and groove-punching mechanism.
Flattening mechanism.
Point-bending mechanism, and
Removing and tempering mechanism.

By referring to Fig. 24, the operations performed by the several units will be readily understood. The first operation is to cut a predetermined length from wire fed to the machine, as illustrated at A. In order to secure uniform length of all the blanks, the wire is cut in two places, thus leaving a short piece at one end which is discarded. The blank is then transferred to the butt-grinding mechanism and is thereby rounded off as indicated at B. The blank is then conveyed to the swaging mechanism where the point-end is reduced in diameter and tapered off, as shown at C. At the next station the point is definitely formed by grinding, as illustrated at D. The blank is then transferred to the next succeeding station at which two operations are performed, that is, the butt-end is rolled down, as indicated at E, and the noucat or groove is punched as shown at F. The blank then proceeds to the next station where it is flattened, as shown at G, to eliminate any bulging of the sides which may have been effected during the grooving operation. The blank then goes to the point-bending mechanism where the point is slightly bent, as indicated at H. This completes the series of operations for forming the narrowing-point and it is then completed except for tempering. The narrowing-point is transferred from the last of the series of operating units to an annealing furnace through which it is transported slowly and from which it is finally discharged into an oil bath.

Supporting and driving structure

The machine has a suitably supported base or bed-plate 1 upon which the various operating instrumentalities are mounted. A main drive-shaft, not shown, is preferably supported as disclosed in our co-pending application Serial No. 232,794, now Patent No. 1,696,484, above referred to. This drive-shaft transmits motion to a shaft 2 (Fig. 4) provided with a worm 3 which meshes with a gear 4 on a cam-shaft 5. Upon the cam-shaft 5 are mounted the cams which control the movements of some of the operating units and the main transfer mechanism, as will be hereinafter more fully brought out.

The cam-shaft 5 drives another cam-shaft 6 through a chain-and-sprocket drive 7. Upon the cam-shaft 6 are mounted the cams which control the movements of the chucks or work-holders at the several stations.

The cam-shaft 5 also drives another shaft 8 through a chain-and-sprocket drive 9. Upon the shaft 8 are mounted the cams which control the movements of others of the operating units, not controlled from the shaft 5.

The foregoing is the general driving mechanism of the machine and includes the drive for the various stations and the carrier which operates in conjunction therewith.

Wire straightening mechanism

The preliminary step of straightening the wire as it is fed to the machine and before cutting the blanks therefrom is not illustrated in the accompanying drawings. A complete disclosure thereof is included in our co-pending application above referred to. It will be sufficient, herein, to state that wire is fed to the machine from a reel or other device and passes first through a wire-cleaner by which any oil, dust, and dirt is removed. The wire is then threaded through a series of inter-digitating rollers mounted in a rotatable frame. Drawing the wire through the rollers while the frame is rotating effects the necessary straightening of the wire prior to its introduction into the cutting mechanism now to be described.

Cutting-to-length mechanism

The wire having been threaded through the straightening mechanism is then inserted into a conveyor 10 slidably mounted on a support 11. The conveyor 10 is operated by a lever 12 which is eccentrically mounted on a disk 13 carried by a shaft 14. The shaft 14 is driven through suitable gearing 15 from a shaft 16 which in turn receives its motion through gears 17 from the shaft 8. As the disk 13 rotates, the lever 12 will draw the conveyor 10 forward and the wire will be presented to the cutting mechanism.

Mounted upon the base 1 is a pair of brackets 18, one of which is shown in Fig. 3. Each bracket supports a lower fixed knife 19 and an upper slidable knife 20, the latter being held in elevated position by means of a spring (not shown) and being periodically depressed by means of cams 21 fixed on the shaft 16. It will be understood that the pairs of knives are spaced apart a distance equal to the length of the blank and that the wire is, therefore, simultaneously cut in two places, as indicated at A, Fig. 24. A short piece of the wire is discarded, but by this arrangement of the knives, uniformity in the length of the blanks is assured.

During the cutting operation the wire is supported in an apertured blank-holder 22 which forms part of the initial transfer mechanism, now to be described.

Initial transfer mechanism

The wire having been cut, the initial transfer mechanism now becomes operative to transfer the blank to the first of the series of chucks, that is, the chuck which holds the blank during the butt-grinding operation.

The blank-holder 22 is mounted on a bar 23 slidable in a channel 24 suitably supported on one of the brackets 18 immediately above and in direct vertical alinement with the carrier of the main transfer mechanism (presently to be described). At its forward end, the bar 23 is provided with a depending arm 25, and at its rear end with a retracting spring 26. The carrier of the main transfer mechanism is provided with an adjustable lug (not shown) which upon movement of the carrier is adapted to contact with the arm 25 and thus shift the bar 23 to the right, thereby transferring the blank to the first of the series of chucks. When the carrier descends to its lower position, contact between its lug and the arm 25 is broken and the bar 23 is returned to its initial position by action of the spring 26.

The mechanism above described is more fully disclosed in our co-pending application Serial No. 232,794, now Patent No. 1,696,484, and reference is made thereto for a more complete understanding thereof.

Main transfer mechanism

In order to transfer the blank from station to station and, thus, to a series of chucks juxtaposed to the several stations, we have provided a carrier 27 provided with a plurality of blank carrying-jaws hereinafter more fully described. Reciprocatory movement in a horizontal plane is imparted to this carrier by a drum cam 28 mounted on the cam-shaft 5. Cooperating with this cam 28 is a follower 29 connected to a lever 30 which is pivoted, at one end, to a bracket secured to the machine-base and at its other end connected to the carrier 27 (Fig. 4). The cam is so formed that upon rotation, it will oscillate the lever 30 and thus reciprocate the carrier 27 in a horizontal plane longitudinally of the machine.

The carrier 27 is also reciprocated in a vertical plane by means of arms 31 which are raised and lowered by levers 32 having rollers 33 working on cams 34 mounted on the cam-shaft 5.

The motion described by the carrier is, therefore, a parallelogram. That is to say, the carrier being in elevated position with the carrying-jaws in alinement with their respective chucks, the carrier first moves to the right and stops when the jaws are in alinement with the next succeeding chucks which take the blanks from the jaws. The carrier then descends and moves to the left where it remains stationary while the work is being performed upon the blanks. The work completed, the carrier again moves to the left and upward to the initial blank-taking position.

As above stated, the carrier 27 is provided with a plurality of blank carrying-jaws 35. These jaws are pivotally mounted on brackets 36 secured to the carrier and are normally maintained closed by means of springs 37. Separation of the jaws is effected by means of a lever 38 pivoted, at one end, on the bracket 36 and having at the other end a roller 39 adapted to ride up on a beveled cam 40 mounted on a bar 41 slidable in the carrier 27. Intermediate its ends, the lever 38 is provided with a projection 42 which, as the lever rides up on the cam, is adapted to enter between the jaw members and wedge them apart.

Motion of the slidable bar 41 is effected by means of a pivoted lever 43 having a roller 44 adapted to contact with lugs 45 and 46 on the bar 41. The lever has roller contact with a cam 47 mounted on the cam-shaft 5. As the cam rotates, it will swing the lever to the right, whereupon the roller 44 will contact with the lug 45 and thus shift the bar 41 to the right. This movement withdraws the cams 40 from contact with the levers 39, thus allowing the jaws 35 to close under the influence of their springs. When the actuating portion of the cam has passed, the lever 43 swings to the left by action of a spring 48 whereupon the roller 44 will contact with the lug 46 thus shifting the bar 41 to the left. This movement of the bar causes separation of the jaws 35 as hereinbefore explained.

*Butt-grinding mechanism*

The blank, having been cut by the mechanism heretofore described, is then transferred by means of the initial transfer to the first of the series of operating units. The blank is received by a chuck 49 which is mounted for reciprocating movement transversely of the machine. The chuck presents the butt of the blank to a grinding wheel 50 which rounds off the butt-end as indicated at B, Fig. 24. The grinding wheel 50 is adjustably mounted and is automatically moved longitudinally of the machine by a mechanism including a cam 51 on a shaft 52 which is suitably geared, as at 53, to the shaft 14. The mounting and operation of the grinding wheel is fully illustrated and described in our application Serial No. 232,794, now Patent No. 1,696,484.

The reciprocatory movement of the chuck is effected through a cam (not shown), the operation of which is similar to that disclosed in our copending application above referred to.

*Swaging mechanism*

The butt-grinding operation having been completed, the blank is taken by the first of the series of jaws 35 and transferred to a chuck 54 which holds the blank during the swaging operation. This chuck is mounted for reciprocatory movement transversely of the machine, the movement being controlled by a suitable cam (not shown) on the cam-shaft 6. Opening and closing of the jaws of the chuck is effected by a bar 55 which receives its motion from a lever 56 which, in turn, is operated by a cam 57 on the cam-shaft 5 (Fig. 3).

The chuck presents the blank to swage 58, best shown in Fig. 6. This swage is of the same type as that illustrated in our co-pending application above referred to and operates in the same manner. The swage blocks have, however, been changed to the form illustrated in Fig. 7 in order to adapt them to the work necessary on this type of needle. The result of the swaging operation is illustrated at C, Fig. 24.

*Pointing mechanism*

The point having been reduced in diameter by the swaging operation, the blank is then received by the next pair of carrying jaws 35 and transferred to a chuck 59 which holds the blank during the pointing operation. This chuck, like those heretofore described, is mounted for reciprocatory movement transversely of the machine, the movement being controlled by a cam (not shown) on the cam-shaft 6. As in the case of the chuck 54, the jaws of this chuck are operated by movement of the bar 55.

The chuck 59 presents the point of the blank to a grinding wheel 60 by which the point is properly tapered off and finished. The grinding wheel is adjustably mounted and is automatically adjusted by a mechanism including a cam 61 actuated by the shaft 8 through suitable gearing 62. The result of the pointing operation is illustrated at D, Fig. 24.

*Butt-forming and groove-punching mechanism*

The point having been finished by the operation just described, the blank is transferred by the next pair of jaws 35 to a chuck 63 which holds the blank during the two operations now to be described.

At this station it is essential that the blank be properly received in the jaws of the chuck so that the proper length of the butt-end will be rolled down and the point accurately presented to the groove-punch. To insure this, we have provided the machinism now to be described.

Journaled in brackets 64 is a shaft 65 which, at its forward end is provided with a pusher or driver 66. This pusher is normally in inoperative position below the plane of the chuck and the carrying-jaws as shown in full lines in Figs. 4 and 5. As the carrying-jaws approach the position where the chuck 63 will take the blank, the pusher 66 is elevated to the position indicated by dotted lines in Figs. 4 and 5. This movement of the pusher is effected by a mechanism including a lever 67 pivoted at one end to the bed-plate 1 and provided intermediate its ends with a roller 68 which rides on a cam 69 on the cam-shaft 5. At its other end, the lever is linked to a lever 70 which is connected to the shaft 65. By this arrangement the pusher is elevated to a position where it is in alinement with the blank and the chuck, as illustrated in full lines in Fig. 8. At this instant, the chuck 63 advances toward the blank from one side and the pusher 66 from the other side, as shown in dotted lines in Fig. 8. Forward movement of the pusher 63 is effected by a mechanism including a cam 71 on the shaft 8 which actuates a lever 72 which, in turn, operates a lever 73 which is connected to the shaft 65. This arrangement imparts forward movement to the pusher 66 simultaneously with the advance of the chuck 63, the result being that the blank is driven into the chuck to the proper extent. This position of the blank is illustrated in Fig. 9. The pusher then withdraws and descends to its initial position.

The blank now being properly positioned in the chuck, the chuck advances toward the groove-punch. The movement of the chuck 63 is controlled by a cam 74 on the cam-shaft 6 which actuates a lever 75 pivoted on a shaft 76 and connected to the chuck. During this movement of the chuck, the butt-end is rolled down by a roller 77 which is actuated by a cam 78. The result of this action is shown at E, Fig. 24. At the completion of the forward movement, the blank is brought to rest on an anvil 79 and a punch 80 then descends and punches the groove or noucat as indicated at F, Fig. 24. The movement of the punch is effected by a crank on a shaft 81 which is periodically clutched to a flywheel 82. This operation is fully disclosed in our co-pending application Serial No. 232,794, now Patent No. 1,696,484, and reference is made thereto for a full understanding thereof.

*Flattening mechanism*

The groove having been punched, the blank is transferred by the next pair of carrying-jaws 35 to a chuck 83 which holds the blank during the flattening operation. This operation is necessary because the sides of the blank at the groove will be slightly bulged by the punching operation. As the chuck advances toward the flattening mechanism it is given a quarter turn by action of a cam 84. When the forward movement is completed, the blank rests on an anvil 85 and a hammer 86 descends and flattens it. The movement of the hammer 86 is effected by the same mechanism as the punch 80. The result of this operation is shown at G, Fig. 24.

*Point-bending mechanism*

The flattening operation completed, the blank is transferred by the next pair of carrying-jaws 35 to a chuck 87 which holds the blank during the operation of bending the point. This chuck is mounted for reciprocatory movement transversely of the machine, which movement is effected by a cam 88 which actuates a lever 89 pivoted on the shaft 76 and operatively connected to the chuck (Fig. 11).

The chuck advances and brings the blank to rest on a stationary die 90 which is mounted in a bracket 91 supported on the bed-plate 1. The bracket 91 also provides the pivot for a lever 92 which at its forward end is provided with a companion die 93 adapted to cooperate with the die 90 in the operation of bending the point. At its rear end, the lever 92 has a cam roller 94 which rides on a cam 95 on the shaft 8. The action of the cam is to depress the die 93, assisted by a spring 96. The result of this operation is illustrated at H, Fig. 24. This completes the series of operations on the blank and a narrowing-point or transfer-needle has now been formed, requiring only tempering.

*Removing and tempering mechanism*

The narrowing-point having been completely formed, is now transferred by means of the next pair of carrying-jaws 35 to the removing mechanism. This mechanism is best illustrated in Figs. 17, 18 and 19. The jaws 35 deposit the narrowing-point on a plate 97 provided with a U-shape opening 98 into which the jaws enter (Fig. 18) and from which the narrowing-point is transferred by a remover 99 to the tempering mechanism presently to be described.

The remover 99 is mounted for oscillating movement controlled by a cam 100 on the cam-shaft 5 (Fig. 16). This cam actuates a lever 101 pivoted at 102 to the frame of the machine. Intermediate its ends the lever 101 is connected to a lever 103 which, in turn, is linked to a lever 104 which oscillates the remover 99. The arrangement is such that the vertical swinging movement of the lever 101 in a plane transverse of the machine is translated into oscillating movement of the lever 104 in a plane longitudinal of the machine.

The remover 99 is provided with a guide-roller 105 which engages a guide 106 pivoted on a bracket 107 supported on the machine base. At its forward end the guide 106 is provided with a pin 108 which engages in an arcuate slot 109 in the bracket 107.

The initial position of the remover 99 is shown in dotted lines in Fig. 18. When a narrowing-point has been deposited on the plate 97 the remover starts its forward movement. During the forward travel of the remover, the guide-roller 105 travels below the guide 106. At the completion of the forward stroke, the guide 106 drops down by gravity to the position illustrated in Fig. 17 and upon return movement of the remover, the guide-roller 105 rides over the guide 106, as shown in Fig. 18.

The remover 99 deposits the narrowing-points in a tube 110 which enters the side wall of a muffle furnace 111, as best shown in Figs. 2 and 16. A plunger or piston 112 works in the tube 110 and conveys the narrowing-points to a mechanism in the interior of the furnace presently to be described. The piston 112 is actuated by a lever 113 which is connected by a link 114 to one arm of a bell-crank 115. The other arm of the bell-crank is provided with a roller 116 which engages a cam 117 on the cam-shaft 5. The shape of the cam is such as to impart to the piston 112, through the levers mentioned, a reciprocatory movement in the tube 110 and, thus, at each stroke of the piston a narrowing-point is introduced into the furnace 111.

The narrowing-point is deposited upon a pair of fixed racks 118, between which is located a movable rack 119. These racks are normally in such position that their teeth are in alinement so that the narrowing-point will be supported by all the racks as shown in Figs. 21 and 22. The movable rack 119 acts to convey the narrowing-point, step by step, through the furnace. Horizontal reciprocation of the rack 119 is effected by a lever 120 connected to a lever 121 which is actuated by a cam 122 on the cam-shaft 5. The rack 119 is also reciprocated vertically by a lever 123 which is actuated by a cam 124 on the cam-shaft 5.

The path of movement of the rack 119 is, therefore, a parallelogram, similar to that described by the carrier 27. That is to say, the rack being in the position illustrated at A, Fig. 23, first is lowered to the position shown at B and then moves to the left as indicated by the arrow in that figure. The movement to the left is only for the distance between adjacent teeth and then the rack is elevated to the plane of the fixed racks. A narrowing-point is then deposited upon the racks. The movable rack is now elevated to the position indicated at C, Fig. 23, and moves to the right thus conveying the narrowing-point to the space between the next teeth on the fixed racks. By this means, each narrowing-point is progressively advanced through the furnace and finally drops through a discharge opening 125 and into an oil receptacle 126. This completes the manufacture of the narrowing-point and it is then ready for the market, except, perhaps, for inspection.

What we claim is:

1. The method of making a narrowing-point which consists in cutting from wire a blank of predetermined length, rounding the butt-end of the blank, swaging the point, grinding the point, bending the butt-end, grooving the point-end, and bending the point.

2. In a machine for the production of narrowing-points, a machine base, a series of operating units disposed longitudinally thereof, a carrier having reciprocatory movement longitudinally of the base and adapted to transfer a narrowing-point blank to each of the units successively, and means to operate the units successively to cut a blank, round the butt-end thereof, swage and grind the point, bend the butt-end, punch a groove in the point-end, flatten the sides of the groove, and bend the point.

3. In a machine for the production of narrowing-points, a machine base, a series of operating units disposed longitudinally thereof, a carrier having reciprocatory movement longitudinally of the base and adapted to transfer a narrowing-point-blank to each of the units successively, and means to operate the units successively to cut a blank, round the butt-end thereof, swage and grind the point, bend the butt-end, punch a groove in the point-end, flatten the sides of the groove, bend the point, and means to remove the finished narrowing-point and transfer it to a tempering unit.

4. In a needle-making machine, a plurality of operating units, a work-holder associated with each of said units for presenting needle-blanks thereto, means for moving said work-holders toward and away from said units, and means associated with one of said units and movable in a direction opposite to that of the work-holder and cooperating therewith to insure accurate positioning of the needle-blank in said work-holder.

5. In a needle-making machine, an operating unit, a work-holder for presenting needle-blanks to said unit, means for moving said work-holder toward and away from said unit, a needle-driver between said work-holder and said unit, and means operative when said work-holder moves toward said unit for moving said needle-driver toward said work-holder to insure accurate positioning of the needle-blanks therein.

6. In a needle-making machine, a series of operating units each actuatable to produce its respective action on a needle-blank to form a completed needle, a carrier for transporting needle-blanks from unit to unit, a plate upon which the completed needle is deposited by said carrier, and means pivotally mounted adjacent said plate and adapted to be moved across said plate to remove the completed needle therefrom.

7. In a machine for the production of narrowing-points, a machine base, a plurality of operating units disposed longitudinally of the base, each unit actuatable to effect its particular action on a narrowing-point-blank to produce a finished narrowing-point, a carrier having reciprocatory movement longitudinally of the base and adapted to transfer the blank from unit to unit, an annealing furnace on said base, means to remove the finished narrowing-point from the carrier and to transfer it to said annealing furnace, means associated with said furnace for progressively transporting the narrowing-point therethrough, means for operating said units, means for operating said carrier, means for operating said removing-means, means for operating said transporting means, and mechanism common to all said means for operating them simultaneously and in synchronism.

8. In a machine for the production of narrowing-points, point-forming mechanism, point-tempering mechanism, and means to convey finished points from the forming mechanism to the tempering mechanism, said tempering mechanism including a furnace and an oil bath, and means for progressively transporting the points through the furnace and for discharging them into the oil bath.

9. In a machine for the production of narrowing-points, point-forming mechanism, point-tempering mechanism, and means to convey finished points from the forming mechanism to the tempering mechanism, said tempering mechanism including a furnace and an oil bath, a plurality of point-supporting racks in said furnace, one of said racks being movable, and means to move said movable rack progressively to transport the points through said furnace and to discharge them into the oil bath.

10. In a machine for the production of narrowing-points, point-forming mechanism, point-tempering mechanism, and means to convey finished points from the forming mechanism to the tempering mechanism, said tempering mechanism including a furnace and an oil bath, a pair of fixed point-supporting racks in said furnace, a movable point-transporting rack between said fixed racks, and means to move said movable rack progressively to transport the points through said furnace and to discharge them into the oil bath.

In testimony whereof we affix our signatures.

ALFRED HOFMANN.
OSWIN KANIS.